*C. Foss,*

*Making Artificial Stone.*

Nº 6,399. Patented Apr. 24, 1849.

UNITED STATES PATENT OFFICE.

COTTON FOSS, OF PAINESVILLE, OHIO.

MACHINE FOR MAKING GRINDSTONES.

Specification of Letters Patent No. 6,399, dated April 24, 1849.

*To all whom it may concern:*

Be it known that I, COTTON FOSS, of Painesville, in the county of Lake and State of Ohio, have invented certain new and useful Improvements in Machinery for Cutting Grindstones by Abrasion out of Flags or Slabs of Stone, of which the following is a full, clear, and exact description, reference being had to the annexed drawings of the same, making part of this specification, in which—

Figure 1:
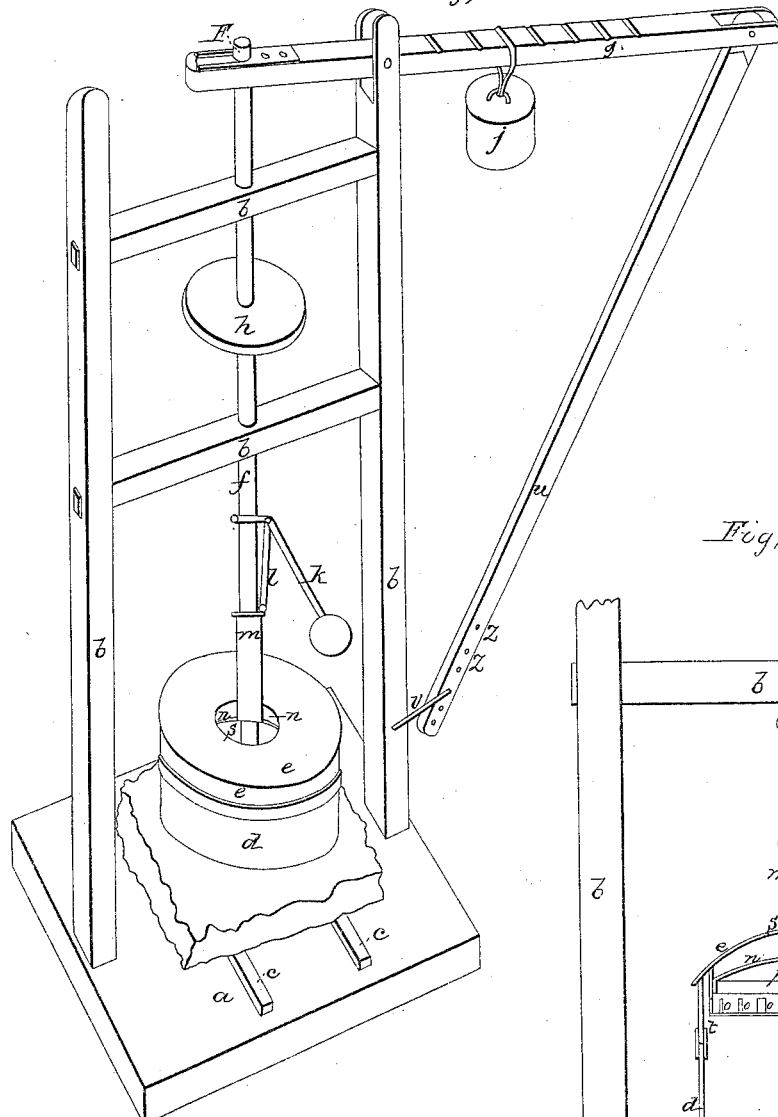
Figure 2:
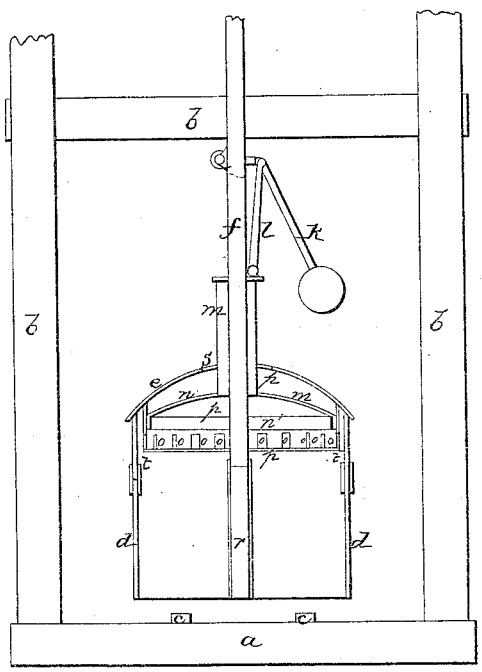

Figure 1 is a perspective view of the machine in the act of cutting a grindstone out of a flag. Fig. 2 is a vertical section through the middle of Fig. 1 upon an enlarged scale.

The same letters indicate the same parts in all the figures.

The nature of my invention and improvement, consists in combining with a revolving hollow cylinder of metal for cutting grindstones by abrasion, out of flags of stone, an apparatus for supplying sand and water for the operation in quantities proportioned to the velocity with which the machine moves, which of course will also be in exact proportion to the demand.

In the accompanying drawings $a$ is the base of the machine upon which the gallows frame $b\ b$ is erected to support the sawing apparatus, $c\ c$ are ribs formed upon the base to support the flag of stone, out of which a grindstone is to be bored. The stone may also be supported upon a truck instead of the ribs, if it is thought more convenient or suitable, $d$ the saw is composed of one or more rectangular pieces of sheet metal, bent into a cylindrical form, and secured to the chuck or head $e$ of the mandrel by screws or otherwise; the mandrel or upright shaft $f$, turns in suitable bearings formed in the frame $b$, in which bearings it also slides up and down, the mandrel is suspended by a head $f'$ in the slot formed in the plate upon the upper side of the lever $g$, by which lever it is raised and lowered at the pleasure of the attendant, the mandrel with the cylinder on its lower end is revolved by a belt passing around the pulley $h$, or it may be turned by cogwheels, the belt and cogwheels being put in motion by a water wheel, steam engine, or other prime mover. The lever $g$ turns upon the pivot $i$ as a fulcrum, and has a movable weight $j$ hanging upon it to counterpoise the weight of the mandrel and saw, so that by moving the weight the saw can be made to press upon the flag with greater or less force as may be required. $k$ is a lever jointed to the mandrel $f$, it has a weight on its lower end, and is jointed to the slide $m$ by a connecting rod $l$. To the lower part of the slide $m$ the arms $n$ of the cylindrical ring $n'$ are attached. It is plain from the arrangement of the parts that the lever $k$ with its ball will be deflected from the mandrel whenever the speed of the latter is increased, and will fall back again whenever the speed slackens, raising and lowering by its vibrations the slide $m$ with the ring $n'$, the ring $n'$ being for the purpose of opening and closing the apertures $o$ in the vessel $p$, through which apertures the sand and water is discharged, the quantity so discharged will be increased when the ring $n'$ is raised, and diminished when it is lowered. The vessel $p$ is secured to the underside of the chuck and may be made of the form represented, or any other more suitable or convenient; on the lower edge of its sides a series of apertures $o$ are made for the sand and water placed in its interior to be discharged through; the sand and water are introduced into the vessel $p$ through the aperture $s$ in the cap of the chuck, $r$. Fig. 2 is a small cylinder constructed in the same manner as the large one and is for the purpose of boring out the eye of the grindstone at the same time that the periphery is bored out by the large cylinder. The sand and water drop down from the vessel $p$ through the space $t$ Fig. 2 between the vessel and the side of the chuck. When it becomes necessary to raise the saw above the stone being cut, the attendant pulls down the rod $u$ and fastens it in any position required, by the hook $v$ which takes into the holes $z$ formed in its lower end.

Having thus described my invention and improvement, what I claim therein as new, and desire to secure by Letters Patent, is—

The combination of the apparatus for regulating the supply of sand and water, with the boring cylinders, whether the several parts be made and arranged as herein described, or in any other substantially the same manner.

COTTON FOSS.

Witnesses:
LEWIS MILLEN,
I. F. SINGLE.